United States Patent [19]

Braaten

[11] 4,443,963
[45] Apr. 24, 1984

[54] FISHING ROD

[76] Inventor: Donald L. Braaten, Box 384, Colfax, Wis. 54730

[21] Appl. No.: 257,884

[22] Filed: Apr. 27, 1981

Related U.S. Application Data

[63] Continuation-in-part of Ser. No. 97,308, Nov. 26, 1979, abandoned.

[51] Int. Cl.³ ............................................. A01K 97/10
[52] U.S. Cl. .......................................... 43/21.2; 43/23
[58] Field of Search .................... 43/21.2, 23; 248/532, 248/408, 354 P; 145/64; 403/109, 378, 108, 316, 317; 81/177 A

[56] References Cited

U.S. PATENT DOCUMENTS

| 470,777 | 3/1892 | Billings | 145/64 |
|---|---|---|---|
| 1,204,388 | 11/1916 | Alver | 145/64 |
| 1,595,275 | 10/1924 | White | 43/18 R |
| 2,241,183 | 5/1941 | Cedar | 43/23 |
| 2,282,618 | 4/1941 | Stewart | 43/18 |
| 2,334,646 | 12/1942 | Price | 43/18 |
| 2,484,401 | 10/1949 | Coie | 403/108 |
| 2,572,502 | 10/1951 | Maxwell | 145/64 |
| 2,612,334 | 9/1952 | DeLamere | 43/21.2 |
| 2,729,012 | 1/1953 | Lee | 43/18 |
| 2,735,208 | 2/1953 | Bartletti | 43/24 |
| 2,776,516 | 1/1957 | Jennette | 43/24 |
| 2,808,676 | 9/1955 | Major | 43/23 |
| 3,216,288 | 11/1965 | Gardner | 145/64 |
| 3,227,015 | 1/1966 | Tremblay | 145/64 |
| 3,279,116 | 9/1964 | Chapman | 43/23 |
| 3,447,254 | 9/1966 | Sobel et al. | 43/18 |
| 3,618,253 | 11/1971 | Edwards et al. | 43/26 |
| 3,789,533 | 2/1974 | Bowerfind | 43/18 R |
| 3,862,509 | 1/1975 | Petersen, Jr. | 43/18 R |
| 4,020,581 | 5/1977 | Genovese | 43/186 F |
| 4,080,080 | 3/1978 | Cisler | 403/108 |
| 4,083,415 | 4/1978 | Kita | 403/316 |
| 4,084,343 | 4/1978 | Genovese | 43/22 |
| 4,207,794 | 6/1980 | Collister | 403/317 |

FOREIGN PATENT DOCUMENTS 681319 10/1952 United Kingdom ................ 145/64

Primary Examiner—Nicholas P. Godici
Assistant Examiner—Kurt Rowan
Attorney, Agent, or Firm—Burd, Bartz & Gutenkauf

[57] ABSTRACT

A fishing rod having a handle which stores a bolt having a pointed shank or spike that can be axially extended from the handle to be extended into the ground or engaged in other structure to support the fishing rod, as when a hook is being baited or the rod is left unattended, or the like. A locking arm is provided fixed to the shank of the bolt for movement thereof and to releasably secure the shank in the stored or the extended position. The pole portion of the fishing rod can have an axial passage for accommodation of the fishing line.

1 Claim, 18 Drawing Figures

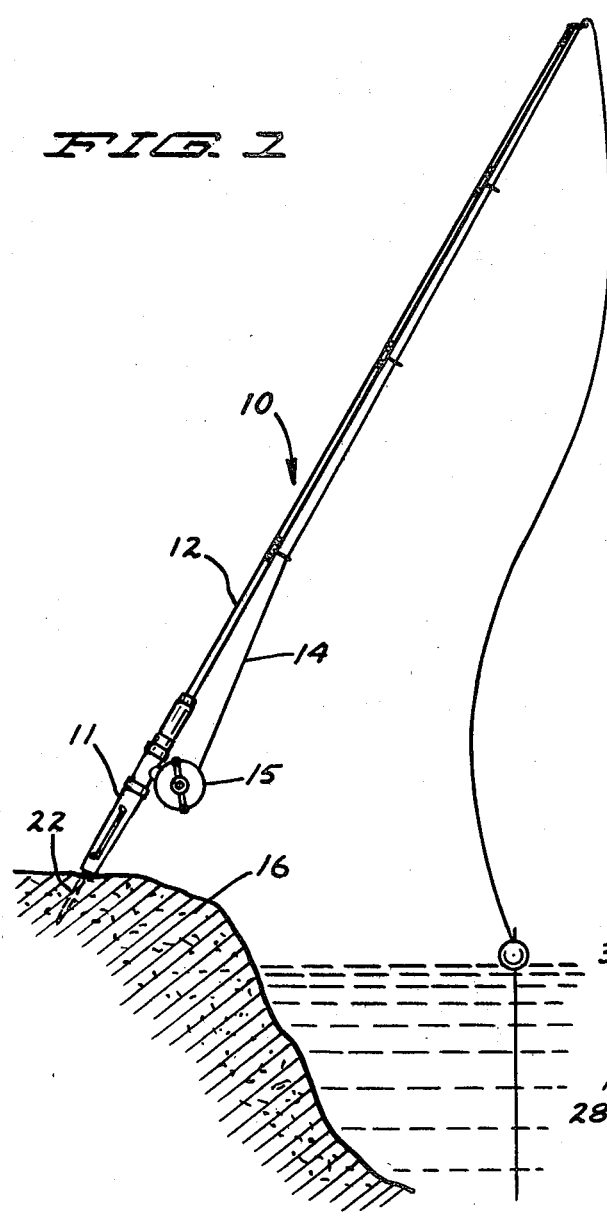
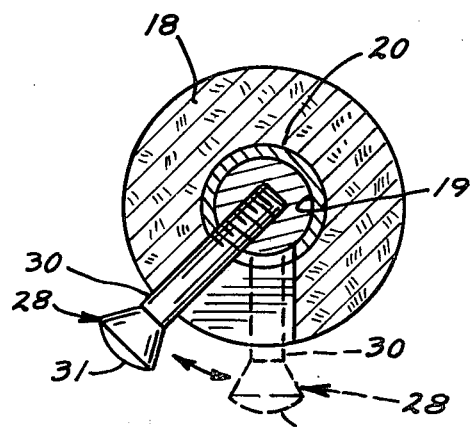
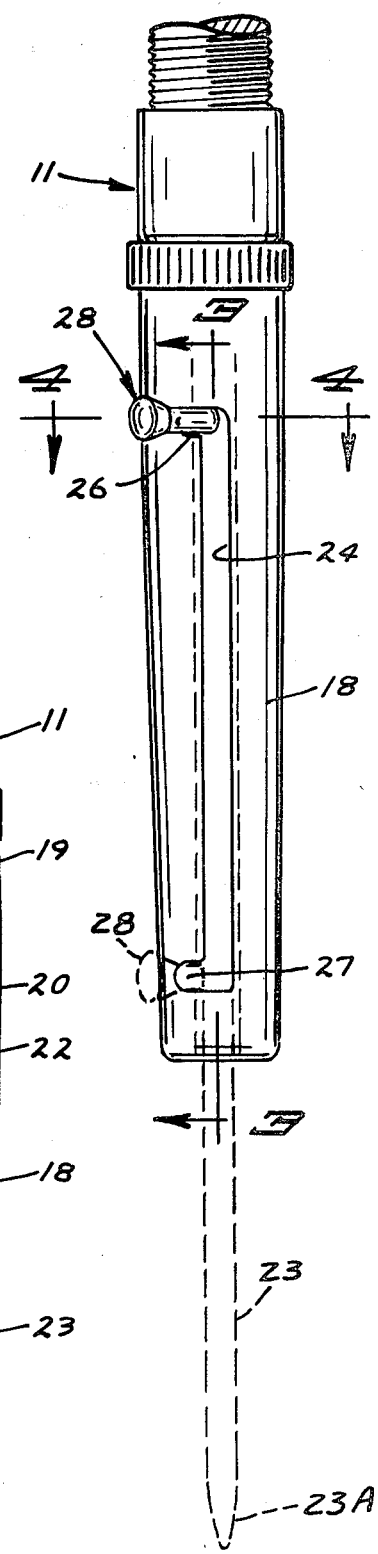

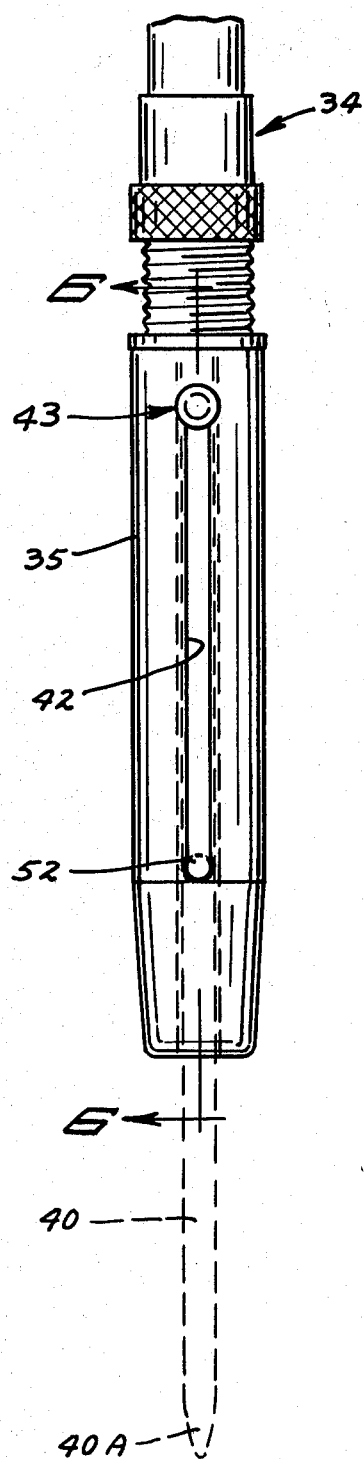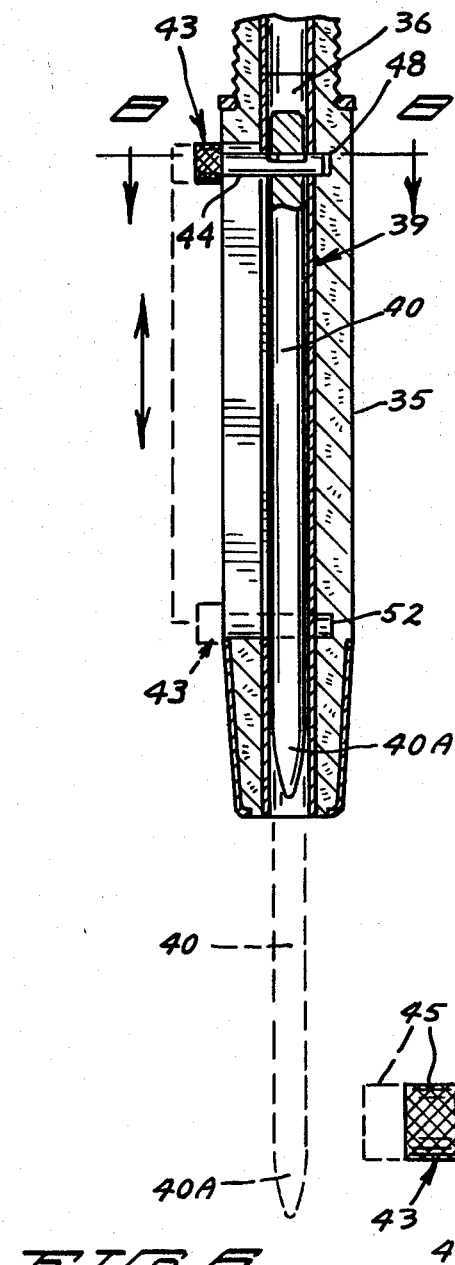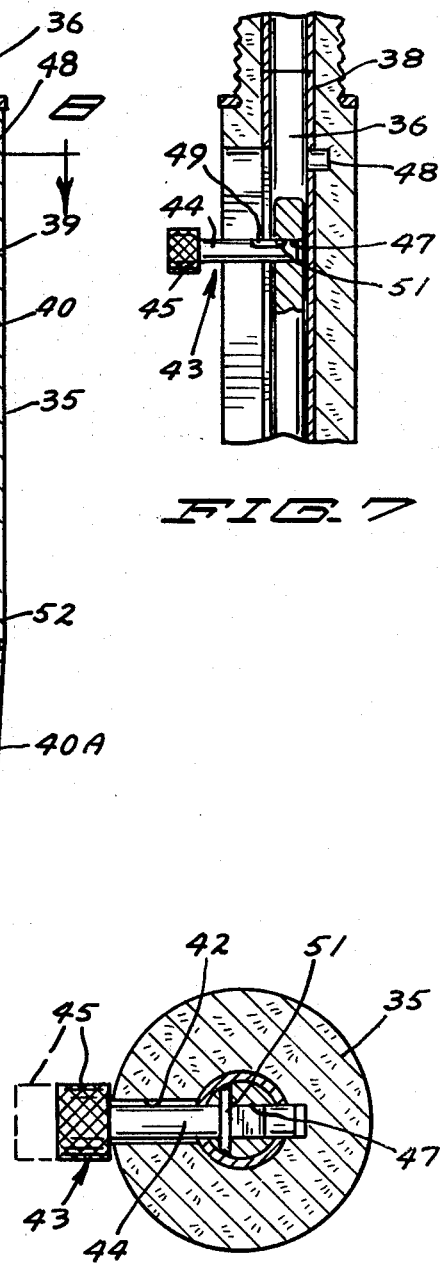

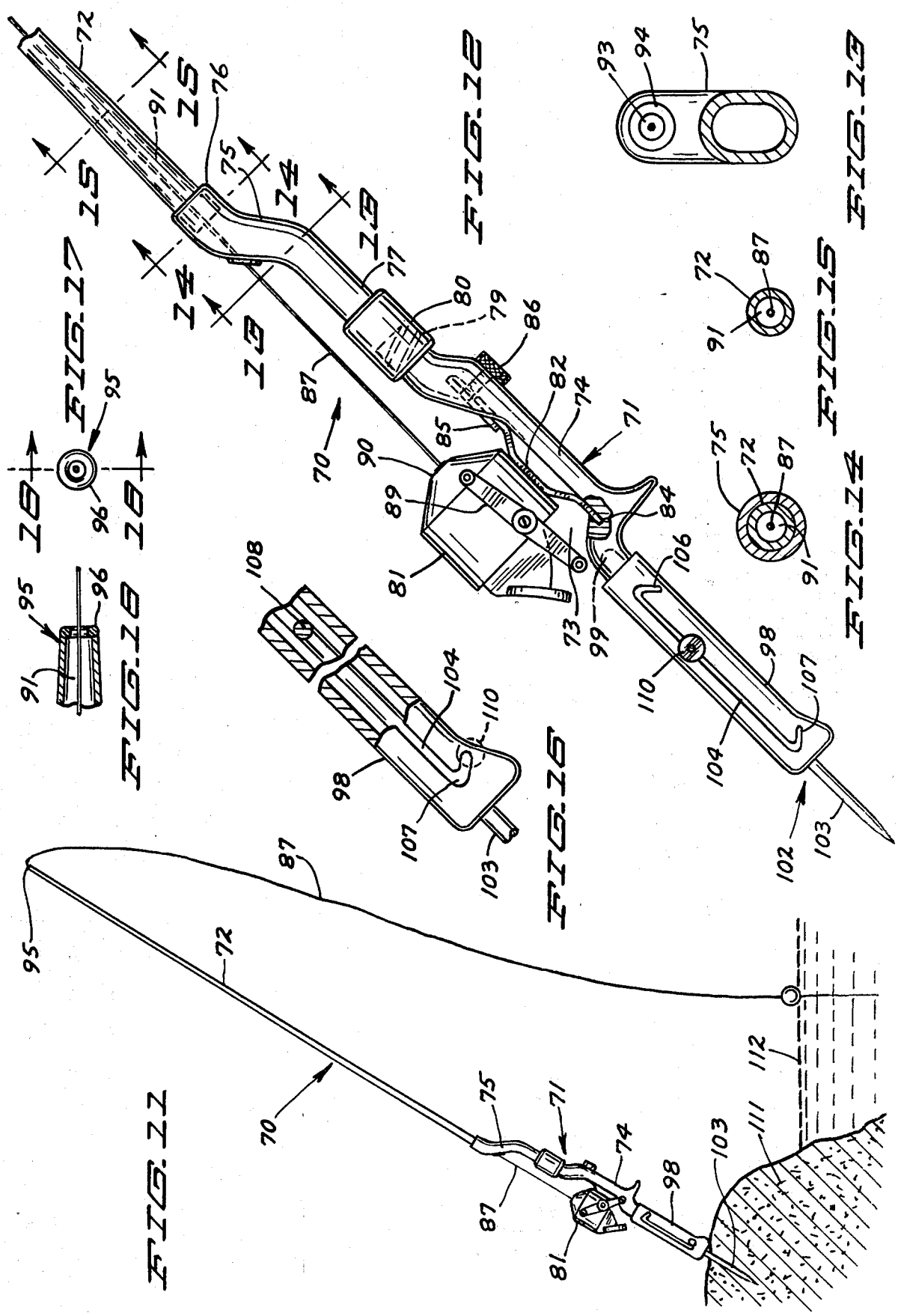

FISHING ROD

CROSS REFERENCE TO RELATED APPLICATION

This is a continuation-in-part of U.S. Patent application Ser. No. 97,308 filed Nov. 26, 1979 now abandoned.

BACKGROUND OF THE INVENTION

When fishing with a fishing rod, the fisherman has frequent occasion to perform incidental functions, such as baiting a hook, changing a lure, removing a fish, and the like. Difficulties are encountered in attempting to perform these functions and at the same time hold the fishing rod. In addition, the fisherman has occasion to leave the rod unattended, as when going to fetch a beverage.

The invention pertains to a fishing rod having a handle in which there is stored a fishing rod supporting bolt. The handle has an interior axial bore at the end of the handle. The bolt has a shank located in the bore axially movable therein and having a pointed end extendible outward of the bore and handle upon outward axial movement of the shank. The bolt is releasably securable in the outwardly extended position whereby the shank can be stuck into the ground or assembled in other structure, such as an oar lock, thereby to support the fishing rod and free the fisherman to perform other incidental functions. The bolt is readily retracted back into the handle so as not to interfere with the general use of the rod. A slot on the handle is open to the bore. A locking arm has a stem attached to the shank of the bolt and extending through the slot in the handle. A cap is located on the outward end of the stem so that the locking arm can be manually manipulated to extend and retract the shank with respect to the handle. Means are provided for securing the locking arm of the bolt in order to fix a position of the bolt.

In one form of the invention the fishing rod includes a pole having an axial passage open at either end of the pole for accommodation of a portion of the fishing line normally trained through eyelets. The handle is axially offset from the pole and a spinning reel feeds fishing line straight into the rear opening of the pole.

IN THE DRAWINGS

FIG. 1 is a schematic view of a first form of a fishing rod of the invention shown in use supported with respect to a ground surface;

FIG. 2 is an enlarged elevational view of the handle of the fishing rod of FIG. 1;

FIG. 3 is a sectional view of the handle shown in FIG. 2 taken along the line 3—3 thereof;

FIG. 4 is an enlarged sectional view of a portion of the handle of FIG. 2 taken along the line 4—4 thereof;

FIG. 5 is an elevational view of a fishing rod handle according to a second form of the invention;

FIG. 6 is a sectional view of the fishing rod handle of FIG. 5 taken along the line 6—6 thereof;

FIG. 7 is a fragmentary sectional view of the fishing rod handle shown in FIG. 6 with the supporting bolt shown in position to be moved rearwardly;

FIG. 8 is an enlarged sectional view of the fishing rod handle shown in FIG. 6 taken along the line 8—8 thereof;

FIG. 11 is a schematic view of a further form of fishing rod of the invention shown in use supported with respect to a ground surface;

FIG. 12 is an enlarged elevational view of the handle and a portion of the pole of the fishing rod of FIG. 11;

FIG. 13 is an enlarged sectional view of the handle of the fishing rod of FIG. 12 taken along the line 13—13 thereof;

FIG. 14 is an enlarged sectional view of a portion of the fishing rod of FIG. 12 taken along the line 14—14 thereof;

FIG. 15 is an enlarged sectional view of a portion of the fishing rod of FIG. 12 taken along the line 15—15 thereof;

FIG. 16 is an enlarged view of a portion of the handle of the fishing rod of FIG. 12 with a part broken away for illustration;

FIG. 17 is an end view of the tip of the fishing rod of FIG. 1; and

FIG. 18 is a sectional view of the tip of FIG. 17 taken along the line 18—18 thereof.

DESCRIPTION OF PREFERRED EMBODIMENTS

Figure 9:
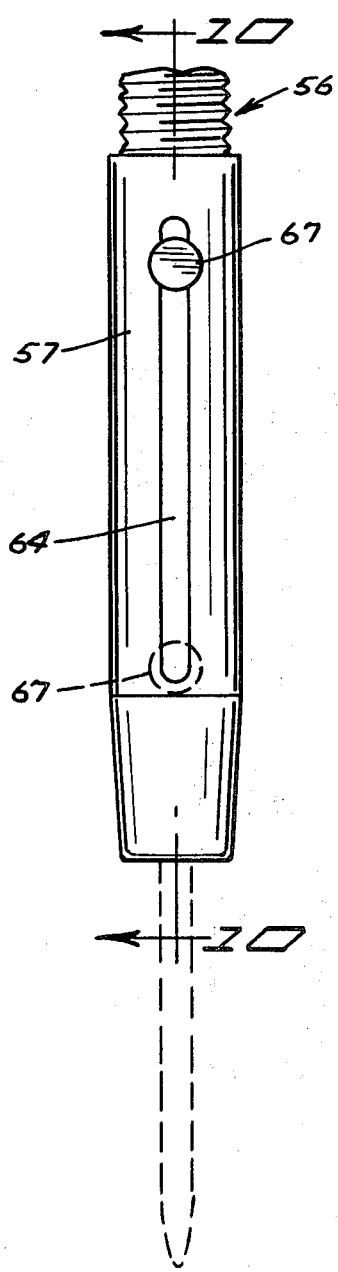
FIG. 9 is an elevational view of a fishing rod handle showing a third form of the invention.

Referring to the drawings, there is shown in FIG. 1 a fishing rod 10 according to a first form of the invention terminating in a handle 11 and having the usual flexible pole or rod section 12 axially extended from handle 11 and carrying the usual fishing line 14 trained from a reel 15 mounted on handle 11. Fishing rod 10 is supported with respect to a ground surface 16 whereby the fisherman is free to perform incidental functions.

Referring to FIGS. 2–4, handle 11 terminates at a rearward grip or base 18 adapted to be grasped by a fisherman for manipulation of the rod 10. Base 18 is generally cylindrical and has an internal axial bore 19. Bore 19 is open at the butt end of base 18 and extends axially forward in handle 11. Bore 19 can be lined by a tubular sleeve 20 of plastic or metal or similar suitable material.

A rigid bolt 22 has an elongate shank 23 located in bore 19 and axially movable therein. Shank 23 has a pointed end 23A and is adapted to slide easily within the bore 19. Upon axial movement of bolt 22, the end 23A is movable between the position of storage in bore 19, as shown in full lines in FIG. 3, and an outwardly extended position extended rearwardly and outwardly from the bore 19 and the base 18 of handle 11, as shown in phantom in FIG. 2. When so extended, the shank 23 can be driven into the ground or engaged in other structure, such as the oar lock of a boat, to support the rod 10.

An elongate longitudinal slot 24 is formed in base 18 and through sleeve 20 open to bore 19 and parallel to the axis of bore 19. Slot 24 is close-ended and has a first circumferential notch 26 at the forward end thereof offset from the axis of slot 24, and a second circumferential notch 27 at the rearward end thereof. The width of slot 24 is less than the diameter of shank 23 of bolt 22. Bolt 22 includes a locking arm 28 having a stem 30 fixed to the shank 23 of bolt 22 as by threading. Stem 30 extends from a location near the forward end of shank 23 outwardly generally perpendicular to the axis of shank 23 through slot 24. A cap 31 is provided on the outward end of stem 30. Cap 31 is manually operable by the fisherman to adjust the position of shank 23 of bolt 22. The stem 30 of locking arm 28 is engageable in either the forward notch 26 or the rearward notch 27. When engaged in the forward notch 26, the bolt 22 and the corresponding shank 23 are in the stored position shown in full lines in FIG. 3 for unencumbered normal use of rod 10. The fisherman can rotate the locking arm 28 to unseat it from the forward notch 26 and move it down the base in the slot 24 to the second or rearward notch 27 and then rotate it so as to be releasably engaged in the second notch 27. In this position, shank 23 is extended with the pointed end 23A extended away from the handle 11 and is releasably locked in this position. The shank 23 can be driven into the ground to support the rod or it can be engaged in other structure, as by inserting it in an oar lock. When this is accomplished, the fisherman is free to perform incidental functions. Movement of the bolt 22 between the stored position and the extended position is accomplished quickly and easily by the fisherman.

A second form of the invention is shown in FIGS. 5-8 wherein there is provided a fishing rod handle 34 having a rearward grip or base 35. An interior cylindrical axial bore 36 is disposed in base 35 and rearwardly open at the butt end thereof. A tubular sleeve 38 of plastic, metal, or other suitable material can define bore 36. A bolt 39 has an elongate shank 40 disposed in bore 36 and axially movable therein. Shank 40 has a pointed end 40A readily movable in bore 36 with shank 40 between a position of storage completely confined within the bore 36, as shown in full lines in FIG. 6, and an extended position outwardly and rearwardly extended from bore 36 and base 35 of handle 34, as shown in phantom in FIG. 6.

An elongate longitudinal slot 42 is formed in base 35 parallel to the axis of bore 36 and open to bore 36 through base 35 and sleeve 38. Bolt 39 includes a locking arm 43 assembled to the shank 40 near the forward end thereof. Locking arm 43 includes a stem 44 extended from shank 40 generally perpendicular to the axis thereof and through slot 42. A cap 45 is exteriorly connected to the end of stem 44 extended through slot 42 for manual manipulation by a fisherman to set the position of shank 40 relative to the handle 34.

An aperture 47 extends transversely through shank 40 of bolt 39 near the forward end thereof. The interior end of stem 44 of locking arm 43 is movably assembled in the aperture 47. The end of stem 44 assembled in aperture 47 can undergo limited transverse movement inwardly and outwardly of aperture 47 or movement in a direction perpendicular to the axis of bore 36 and perpendicular to the direction of movement of shank 40. A first or forward transverse locking indent or hole 48 is formed in the side wall of bore 36 near the interior or forward end thereof disposed opposite slot 42. With the aperture 47 of shank 40 aligned with locking indent 48, the end of stem 44 is movable into the locking indent 48 to lock the position of shank 40 with respect to bore 36. When so engaged, the bolt 39 is in the stored position, as shown in full lines in FIG. 6. Stem 44 is readily movable outward of locking indent 48 by pulling cap 45. Stem 44 has a notch 49 proximate the end thereof. As shown in FIG. 8, a transverse pin 51 is secured to the shank 40 and extends across the aperture 47. Pin 51 is located in the notch 49 so as to restrict the outward movement of stem 44 and maintain it engaged with the aperture 47.

A second locking indent or hole 52 is located in the side wall of bore 36 opposite slot 42 and near the rearward end of bore 36. Shank 40 can be moved to a position where the aperture 47 thereof is in alignment with the locking indent 52 such that stem 44 of locking arm 43 can be moved into locking engagement with the second locking indent 52. In this position, the shank 40 is extended from the bore 36 and rearwardly from handle 34, as shown in phantom in FIGS. 5 and 6, whereby the pointed end 40A of shank 40 can be inserted into the ground or assembled with other structure, such as an oar lock on a boat. This frees the fisherman's hands to perform other incidental functions.

The position of bolt 39 is quickly and easily adjusted between the stored position with the stem 44 of locking arm 43 in engagement with the first indent 48 wherein there is permitted unobstructed use of the fishing rod in normal fashion, and the extended position with the stem 44 of locking arm 43 engaged in the second indent 52. This is accomplished simply by pulling the cap 45 to disengage the stem from one of the locking indents wherein the bolt 39 is moved to the desired position. It will be apparent that intermediate locking indents could be provided for locking the bolt 39 in intermediate positions. The longitudinal ends of slot 42 limit the range of movement of bolt 39, and the longitudinal edges of slot 42 guide movement of locking arm 43 and, hence, bolt 39.

Figure 10:
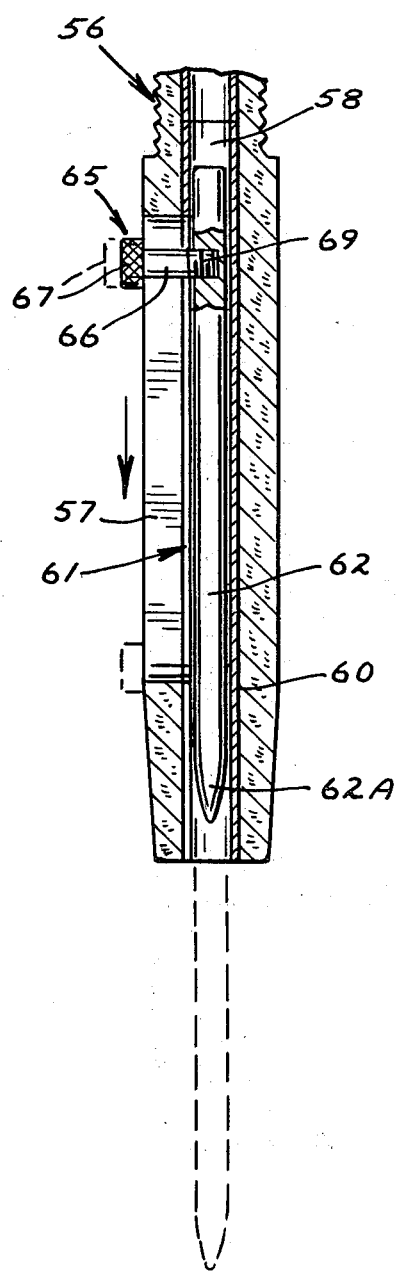
FIG. 10 is a sectional view of the fishing rod handle of FIG. 9 taken along the line 10—10 thereof.

A third form of the invention is shown in FIGS. 9 and 10 wherein there is provided a handle 56 having a base 57. A longitudinal, central axial bore 58 is located in the base 57 and can be defined by a tubular sleeve 60 of metal, plastic, or other suitable material. Bore 58 is open at the butt end of base 57 and contains an elongate longitudinal bolt 61. Bolt 61 has a shank 62 with a pointed end 62A. An elongate slot 64 is open through base 57 and tubular sleeve 60 to the bore 58. The width of slot 64 is less than the diameter of shank 62 whereby shank 62 is retained in the bore 58. A locking arm 65 has a stem 66 with an interior end connected to the shank 62 of bolt 61. The outer end of stem 66 has a cap 67 which can be manually manipulated by a fisherman. The shank 62 has a threaded hole 69 near the forward end thereof. The inner end of stem 66 is also threaded to threadably engage the hole 69. The hole 69 is sufficiently deep such that the turning of the cap 67 threads the stem 66 into hole 69 drawing the shank 62 of bolt 61 up tight against the inner edges of the slot 64 to secure the shank 62 in place. As shown in full lines in FIG. 10, the stem 66 is drawn inward of the hole 69 to the point where the shank 62 is securely held in the stored position. Rotating the cap 67 in such a direction as to unseat the stem 66 in the hole 69 and loosen the shank 62 with respect to the interior edges of the slot 64 permits movement back and forth of the locking arm 67 and, thus, bolt 61. The bolt 61 can be moved outwardly toward the rear end of base 57 and then secured again. In this position, the shank 62 and shank 62A extend rearwardly and outwardly from the base 57. In this position, the shank can be extended into the ground or into other structure in order to hold the handle 57 in the corresponding fishing rod (not shown). The locking arm 65 is quickly engaged and disengaged to adjust the bolt 62 to the proper and desired position.

A further embodiment of fishing rod according to the invention is shown in FIGS. 11 through 18 and is indicated generally at 70. Fishing rod 70 includes a generally longitudinal handle section 71 connected to a tubular, generally longitudinal resilient pole section 72. Handle section 71 includes a reel mount section 74 and an offset connecting member 75 with a forwardly open end 76. The rearward end of pole 72 is telescopically engaged in the forward end 76 of connecting member 75 and is secured therein by suitable means such as glue. The mid portion of connecting member 75 curves laterally outward then rearwardly, terminating in a rearwardly open end 77 which is parallel to but axially offset from the forward end 76 of connector 75. The forward end 79 of reel mount 74 is secured to the rearward end 77 of connecting member 75 as by a threaded collar 80 being rotatably assembled to the end 77 of connector member 75 and engaging suitable threads provided on the forward end 79 of base 74.

Reel mount 74 has a recess 73 to mount a fishing reel. A fishing reel housing 81 is secured to reel mount 74 in conventional fashion. A bracket 82 secured to the housing 81 has forwardly and rearwardly extended legs. The rearwardly extended leg of bracket 82 engages a slot 84 provided in base 74. The forward leg of bracket 82 is secured by a plate 85 which is releasably secured to the reel mount 74 by a bolt 86. Reel housing 81 contains a conventional fishing reel (not shown) carrying a supply of fishing line 87. The usual reel handle 89 is provided for taking in the line 87. Fishing line 87 is let out and taken up with respect to reel housing 81 through a forward opening 90.

Pole 72 has a longitudinal axial passage 91 open at the tip and rearward end of the pole. Offset connecting member 75 has an opening 93 in alignment with the axial passage 91. A toroidal eyelet or guide 94 is disposed in surrounding relationship to the opening 93 in offset connecting member 75. The inlet-outlet point of fishing line 87 from reel housing 81 is in axial alignment with the opening 93 and axial passage 91. The fishing line 87 extends from the reel housing 81 through reel opening 90, through the offset connector opening 93 and through the axial passage 91 of pole 72, emerging at the tip 95 of pole 72. As shown in FIGS. 17 and 18, tip 95 terminates in a toroidal eyelet or guide 96 having rounded edges to prevent damage to fishing line 87. Guide 96 can be ceramic or plastic or the like. Fishing line 87 thus avoids the usual eyelets mounted along the outer periphery of the pole. Tangling of the line is avoided and more efficient casting and taking up is permitted. The eyelet or guide 94 on offset connector member 75 also has rounded edges to prevent damage to fishing line 87. Normally, the fishing line 87 will not be in contact with the guide 94 as the inlet-outlet point of fishing line 87 from reel housing 81 is aligned with the opening 93 of offset connector member 75.

Handle section 71 terminates in a rearward grip or base 98 adapted to be grasped by a fisherman for manual manipulation of the rod 70. Base 98 is generally cylindrical and has an internal axial bore 101. Base 98 is assembled to the reel mount section 74 as by a plug 99 secured to base 98 and inserted into the open end of reel mount 74, being secured therein by suitable means such as glue, threads or the like. Bore 101 is open at the butt end of base 98 and extends axially forward in handle grip 98.

A rigid bolt 102 has an elongate generally cylindrical shank 103 located in bore 101 and axially movable therein. Shank 103 has a pointed end and is adapted to slide easily within base 102. Longitudinal movement of shank 103, like handle 71, is along an axis that is laterally offset from the axis of passage 91 of pole 72 and line 87. Upon axial movement of bolt 102 the end of shank 103 is movable between a position of storage in base 98 and an outwardly extended position extended rearwardly and outwardly from the bore 101 and the base 98. When so extended, the shank 103 can be driven into the ground as shown in FIG. 11 or engaged in other structure to support fishing rod 70.

An elongate longitudinal slot 104 is formed in base 98 and open to bore 101 parallel to the axis of bore 101. Slot 104 is closed ended and has a first circumferential notch 106 at the forward end thereof offset from the axis of slot 104, and a second circumferential notch 107 at the rearward end thereof. First and second slots 106, 107 are reversely turned with respect to slot 104. First notch 106 extends circumferentially and rearwardly with respect to slot 104 forming an acute angle with slot 104. Second notch 107 extends circumferentially and forwardly with respect to slot 104 forming another acute angle with slot 104. The width of slot 104 is less than the diameter of shank 103. Bolt 102 includes a locking arm having a stem 108 fixed to the shank 103 in similar fashion to the handle configuration shown in FIG. 3. A cap 110 is provided on the outer end of stem 108. Cap 110 is manually operable by a fisherman to adjust the position of shank 103 of bolt 102. The stem 108 is engagable in the forward circumferential notch 106 to releasably lock the stem 103 in the storage position. The reverse turn of the notch 106 with respect to the slot 104 more securely and positively locks the stem 108 therein. The stem 108 is engagable in the rearward or second slot 107 to lock the shank 103 of bolt 102 in the outwardly extended position. The reverse turn of the notch 107 with respect to the slot 104 more positively and securely locks the stem 108 therein to inhibit accidental disengagement.

In use, as shown in FIG. 11, spinning reel 81 is mounted at the recess 73 of mount portion 74 which is laterally offset from the axis of pole 72 by offset connecting member 75. The inlet-outlet point of fishing line 87 trained from reel housing 81 is aligned with the axis of pole 72. Fishing line 87 extends straight from reel housing 81 through the opening 93 of offset connecting member 75 and through the axial passage 91 of pole section 72, emerging at tip 95. In such configuration, line 87 is not apt to be tangled. Casting with the fishing rod 70 is facilitated. Shank 103 of bolt 102 is in the outwardly extended position with stem 108 releasably locked in reverse turned notch 107. Shank 103 is extended into a ground surface 111 supporting fishing rod 70 in an inclined orientation with the line 87 extended from the tip 95 into a body of water 112. The axis of shank 103 is laterally offset from the axis of pole section 72. When extended into the ground surface 111, the shank 103 is better able to withstand a moment in supporting the fishing rod 70 than it is able to resist an outward pulling force. When a load is imposed upon the fishing line 87 as by catching a fish, the lateral offset between the axis of shank 103 from the axis of pole section 72 results in less outward force upon the shank 103 that would tend to disengage it from the ground surface 111. The rounded eyelet 94 at the opening 93 of offset connector 75, and the rounded eyelet 96 at the tip 95 of pole section 72 reduce frictional wear upon fishing line 87 as it is reeled out and drawn in. When the fishing rod 70 is disengaged from the ground surface 111, the cap 110 of bolt 102 is manipulated to disengage the stem 108 from the rearward notch 107 and move it forwardly to a position in engagement with the forward notch 106 where it is securely located because of the reverse turned relationship of the forward notch 106 with respect to the slot 104. The bolt 102 is less apt to become accidently disengaged from the forward notch 106.

The embodiments of the invention in which an exclusive property or privilege is claimed are defined as follows:

1. A fishing rod comprising:

a fishing rod section;

a fishing rod handle connected at a forward end to the fishing rod section;

said fishing rod handle having an axial bore open at the rearward end of the handle;

a bolt having an elongate shank located in the bore and axially movable therein between a first position of storage in the axial bore and a second position with an end portion of the shank extending rearwardly and outwardly of the handle and axial bore through said opening for engagement with structure for unattended support of said fishing rod;

said handle having an elongate slot means open to and parallel to said axial bore;

a locking arm having a stem, an interior end of said stem being assembled to said bolt shank, said stem extending from said shank through the slot means with an exterior end located exteriorly of said handle for manual manipulation to move said shank in said bore;

means to releasably lock the locking arm including an aperture formed in the shank of the bolt and extending transversely therethrough, said stem of the locking arm being movably assembled in said aperture with an end extendable out of the aperture on the side of the shank opposite the slot means, a first locking indent located in the side wall of the bore opposite the slot means and axially located to be engaged by the end of the stem extending through the aperture in the shank when the shank is in the first of said positions to lock the shank in said position;

a second locking indent formed in the side wall of the bore opposite the slot means and axially located to receive the end of the stem extending through said transverse aperture in the shank when the shank is in the second position to lock the shank in position;

said stem having a notch proximate the end of the stem extendable out of the aperture, a transverse pin secured to the shank extended across the aperture and located across the notch, said notch having an inner edge positioned to be intercepted by the transverse pin upon limited outward movement of the stem to restrict the amount of outward movement of the stem and maintain it engaged in the aperture.

* * * * *